United States Patent Office 2,930,828
Patented Mar. 29, 1960

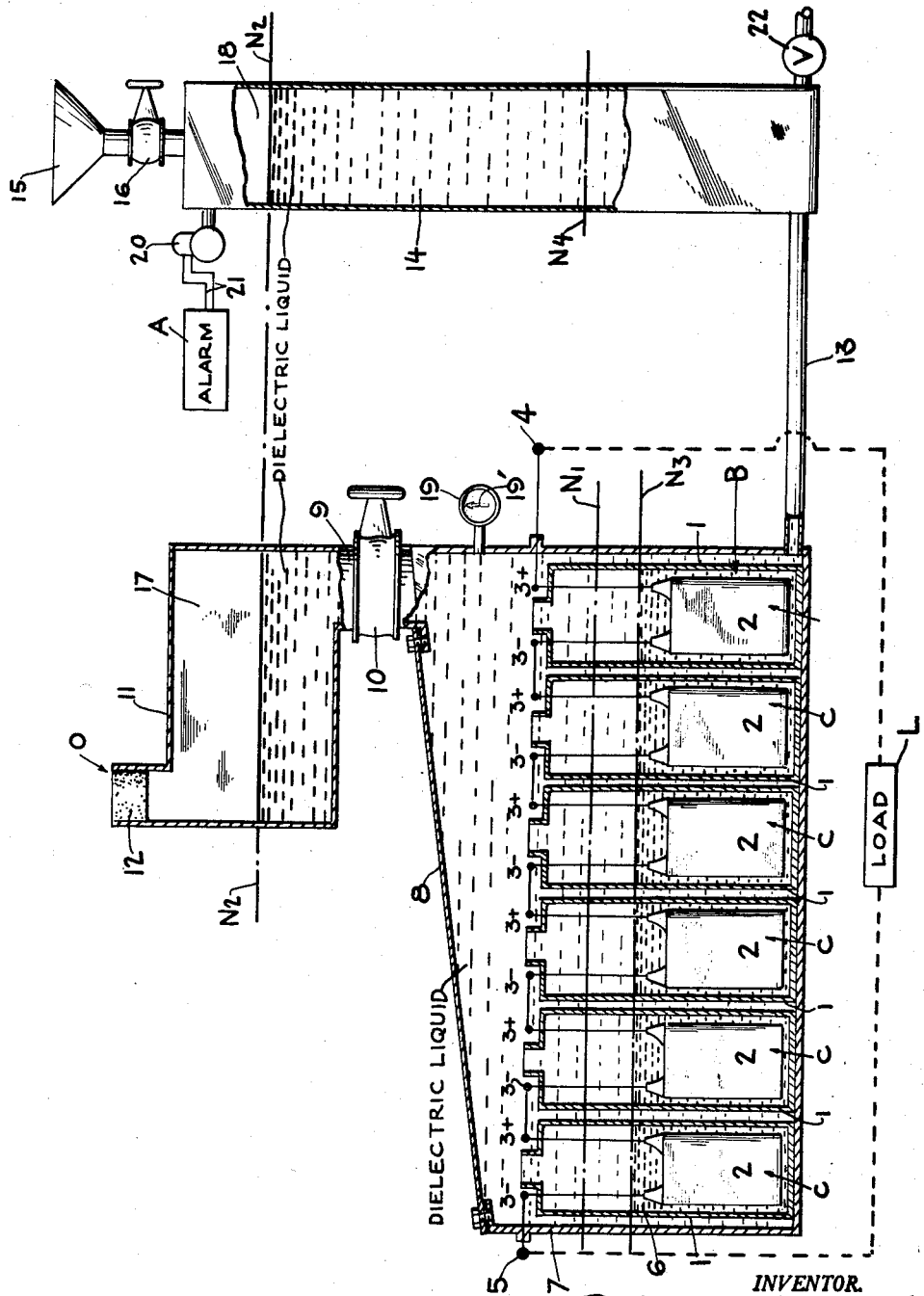

2,930,828

STORAGE BATTERIES INTENDED TO BE USED IN INFLAMMABLE ATMOSPHERES

Rodolphe André Herold, Boulogne-Billancourt, France, assignor to Société des Accumulateurs Fixes et de Traction (Societe Anonyme), Romainville, France, a company of France Application March 14, 1958, Serial No. 721,600

Claims priority, application France March 23, 1957

16 Claims. (Cl. 136—6)

This invention relates to storage batteries and more particularly to batteries of this kind which are used primarily in inflammable or other dangerous atmospheres.

Some high capacity storage batteries, e.g. those used on board submarines or for locomotives in mines, have to meet severe safety requirements concerning the insulation. Moreover, even admitting that the charging of such batteries may be effected under good ventilation conditions, gases and especially hydrogen which may be evolved during discharge must be prevented from being diffused externally and causing explosions.

To this end, it has already been proposed, especially in the case of alkaline storage batteries, to seal the batteries after charging in a gas-tight manner, for the said batteries can be manufactured so as to evolve practically no gas during their discharge.

However, this procedure only gives a modicum of security, since the batteries, in order to provide a utilizable voltage, comprise numerous series-connected cells. The capacity of the said cells not always being strictly the same, it may happen that towards the end of the discharge one or several completely discharged cells are put under inverted charge by the other cells which may still give up power. It is well known that during an inverted charge the cells evolve a great quantity of hydrogen.

Therefore, if the storage cells are tightly closed or sealed after the charge, as a precaution, there is a risk that in case of inversion, the inverted cells may develop an exaggerated internal pressure and that their casings may be warped and even ruptured.

In order to avoid this risk it has been proposed to connect the insides of the storage cells with the outer atmosphere through passages made like narrow, so-called "safety" slots able to prevent an ignition of the gases evolved inside the battery from spreading outside the battery.

Such a realization is disadvantageous since it does not prevent the gases from spreading or dispersing outside of the battery and moreover, the size of the slot-like passages is very critical. This arrangement does not, therefore, give an absolute security against the risks of igniting the dangerous gases or vapors e.g. fire-damp, vapors of petrol-products, etc., existing in the outer atmosphere about or near the battery.

An object of the present invention is the provision of a storage battery device that among its features possesses that of entire security against ignition hazards and/or against the risk of an inflammatory wave spreading towards the outer atmosphere.

According to the invention, the storage cells constituting the battery are placed, in the open state, in the lower part of a gas-tight box or container communicating through its higher part with the atmosphere through a stoppable opening or outlet, said box or container comprising in its wall an instrument sensitive to pressure, and all the free spaces or voids inside this box or container, including the free spaces or voids in the cells, being filled with a dielectric liquid.

When the battery is being charged, a stopping or control device for the opening is open so that evolving gas may escape freely during charging. The said stopping or control device for the opening is operated to shut the latter after charging is completed, so that the discharge of the battery takes place in a closed vessel or container. In this way, at the end of the discharge, when an abnormal gaseous evolution takes place in one of the cells, the stopping device for the opening being in closed condition, the instrument sensitive to pressure immediately reveals the said gaseous evolution.

However, it is known that in some storage cells, the volume of the electrolyte changes between the state of charge and the state of discharge. Consequently, in an advantageous embodiment of the invention, the lower part of the box is in communication or connected with a closed volume (equalization chamber) containing a gas which by changing its volume, compensates or allows for the variation of the electrolyte volume.

More especially, it is known that in alkaline storage cells, the volume of the electrolyte e.g. potassium hydroxide decreases during discharge. Consequently, due to this equalization chamber, the box or battery container is progressively put under partial vacuum during the normal discharge. On the contrary, if one or more of the cells of a battery of the latter within the container should become inverted, the volume of the evolved gases will progressively put the interior of the said box or container under pressure, so that an instrument sensitive to pressure mounted as described will be able to reveal this abnormal functioning.

Further objects and features of this invention are the provision of a simple economical arrangement for batteries embodying the desirable attributes hereinabove discussed.

Other objects and features will become apparent from the following description and the accompanying drawing wherein:

The figure depicts a storage battery arrangement embodying the present invention and illustrating its application for use, for example, on a mine locomotive.

This battery B comprises several series-connected open state storage cells C of great capacity, each of them being constituted by an open topped casing 1, the lower part of which contains the stacks 2 of positive and negative plates. The positive and negative plates of each stack are connected respectively to terminals 3+ and 3— situated on the top of the casing, said terminals 3+ and 3— being series-connected together and to the output terminals 4 and 5 of the battery which are connected to the utilization apparatus e.g. the locomotive load L. The lower part of each of the cell casings 1 contains a volume of conventional alkaline electrolyte 6, for example, 20% KOH potassium hydroxide solution having a density of approximately 1.1884. The casings 1 of the cells C rest on the bottom of a strong-walled box or container 7 which is closed by a removable sloping lid 8. When in closed position, the lid seals the opening which it covers. The said box is extended upwardly by a shaft or conduit 9 which may be stopped, blocked, and/or otherwise controlled by means of a valve 10, said shaft or conduit 9 opening into an expansion tank 11, said tank communicating with the outside or exterior environment through an outlet O which has a filter 12.

A pipe or conduit 13 provides communication between the lower part of the box 7 with the interior of an equalization chamber 14 which may be closed off at its top as by a valve 16, said valve being optionally extended by a funnel 15. Lastly, a third valve 22 is provided to control an outlet for the chamber 14 serving thus also to permit draining the box 7 as well as chamber 14 if desired.

In operation of the arrangement, the valves 10 and 16 being opened and the inside of the box or container being temporarily put under partial vacuum, for example, by applying suction at the outlet O the box or container 7 may be filled via funnel 15 with a neutral dielectric liquid having a lower density than that of the electrolyte 6, not being capable of being emulsionized by the said electrolyte, and being of course unable to alter or attack any of the elements constituting the cells C or their casings 1 or box 7. The said liquid may advantageously be a mineral oil, e.g. the oil which is commercially known as "Mayoline," which is designated as a refined vaseline oil having a specific gravity of approximately 0.882. It has a viscosity of Engler 4 to 20° C. and 1.76 at 50° C. and a freezing point of −36° C. Any other mineral oil or neutral dielectric liquid having similar properties may be used.

Assuming that the cells C of the battery are in the charged state, the electrolyte level in those cells settles on an average at $N_1$. The dielectric liquid is introduced into the device in sufficient quantity so that it wholly fills all the empty spaces or voids within the box or container 7 and comes into co-planar contact with the electrolyte planes $N_1$ within the cell casings 1 and settles at a level $N_2$, thus leaving empty spaces or avoids 17 in the expansion tank 11 and 18 in the equalizing chamber 14. The valves 10 and 16 are then closed and the battery B is put in use.

During discharge of the battery B, the average electrolyte level $N_1$ in the various cells falls progressively until it reaches a new level $N_3$, this change of level being made possible by the addition of dielectric liquid coming from the equalizing chamber (via conduit 13), the level of which dielectric liquid in chamber 14 falls from $N_2$ to $N_4$.

During normal functioning, the closed or confined space defined by the box 7 and the equalizing chamber 14 is thus subject to partial vacuum in space 18 since valves 10 and 16 are closed. A manometer 19, placed in the wall of the box 7 and preferably disposed so that it may be constantly seen by the operator, is sensitive to and shows the existence of this depression and its extent. If the discharge of the battery goes on normally, the depression indicated by the manometer 19 should progressively increase. The existence of a gaseous evolution in operation of the battery is immediately revealed by the inversion of the direction of progressive movement of the manometer indicating needle 19′.

If the conditions of charge and discharge are analogous in each of the utilization cycles of the battery, the readings of the said manometer gives information about the capacity remaining in the battery at every moment of its use.

For safety, a second manometer 20 which may serve, for example, to close an electrical circuit 21 actuating an alarm A, may be provided for functioning when the pressure inside the confined space defined by box 7 and chamber 8 rises above a predetermined selected value. This dangerous pressure may be chosen as slightly higher than normal atmosphere pressure, so that the alarm apparatus is not activated during the normal charging operation of the battery. For example, this selected pressure may range from 1.1 to 1.2 atmospheres.

When the battery B must be recharged, the valve 10 is opened and the gases which may evolve during the charging operation may be evacuated via the shaft or passage 9 and the filter 12, via a suction hose (not shown) applied over opening O. In the alternative, the arrangement may be removed to an open air environment so that gaseous discharge from opening O will occur in a safe environment. When the charging operation is over, and if needed, after a time sufficient to allow for the evacuation of the gases which may remain in the cells, the valve 10 is closed again and the battery B is again ready to be used.

It is, of course, necessary that the volume of the equalization chamber 14 be larger than the difference in the electrolyte volumes of the battery B between its charged and discharged states and that the volume of dielectric liquid capable of being contained in the expansion tank 11 should be also at least equal to this difference in volumes. The filter 12 which is of any conventional type is intended to prevent the pollution of the dielectric liquid by foreign bodies.

While a specific embodiment of the invention has been described, variations within the scope or the appended claims are possible and are contemplated. There is no intention of limitation to the exact details shown and described.

What is claimed is:

1. A safety storage battery intended to be used while being discharged in a dangerous atmosphere comprising a fluid tight container, at least one open state cell containing alkaline electrolyte positioned within said container, neutral dielectric liquid filling all voids or empty spaces within said container as well as those in the cell, said dielectric liquid having a density lower than that of the electrolyte of said cell, means providing a sealable opening at the uppermost portion of said container, pressure sensitive means in a wall of said container communicating with said neutral dielectric liquid for detecting changes in internal pressure within said container and an equalization chamber partially filled with said dielectric liquid and directly communicating with said container so as to permit free flow of the dielectric liquid between said chamber and container in a direction dependent upon volume changes of the electrolyte during use of the battery.

2. A safety storage battery intended to be used while being discharged in a dangerous atmosphere, comprising cells for said battery arranged in the open state and containing alkaline electrolyte, said cells being disposed in the lower part of a fluid-tight box having an opening at the top, all the empty spaces inside the box, all empty spaces of the cells included being filled with a neutral dielectric liquid having a density lower than that of the electrolyte of said cells, said box including an instrument sensitive to pressure in a wall thereof and in communication with the neutral dielectric liquid, an expansion tank having a passageway communicating with said box via said opening, valve means in said passageway and an equalization chamber communicating directly with said box and partially filled with said neutral dielectric liquid, so that the latter may flow freely to and fro between said box and chamber in a direction dependent upon relative changes in volume of the electrolyte in said cells during their use.

3. The battery of claim 2 including a filter which provides communication with outside atmosphere from the said tank.

4. The battery of claim 2 wherein said box and chamber define a confined space, an instrument sensitive to pressures within said chamber and alarm means operable by said instrument at selected pressures.

5. The battery of claim 2 wherein said box comprises a sloping lid whose slope is directed towards said opening at the top of the box.

6. A safety storage battery intended to be used while being discharged in a dangerous atmosphere comprising a fluid-tight container, open state cells containing alkaline electrolyte positioned within said container, an expansion tank having a passageway communicating with said container, valve means in said passageway, neutral dielectric liquid filling all voids or empty spaces within the container as well as those in the cells, said dielectric liquid having a density lower than that of the electrolyte of said cells, pressure sensitive means in a wall of said container communicating with said neutral dielectric liquid for detecting changes in internal pressure within said container and an equalization chamber partially filled with said liquid and directly communicating with said container so as to permit free flow to and from the container of the liquid.

7. The battery of claim 6 wherein said alkaline electrolyte has a specific gravity greater than unity and wherein said neutral dielectric liquid has a density of less than unity.

8. The battery of claim 6 wherein said electrolyte is a potassium hydroxide solution, and wherein said neutral dielectric liquid is a mineral oil.

9. The battery of claim 6 wherein said neutral dielectric liquid is a mineral oil having a density of approximately 0.882.

10. The battery of claim 6 wherein said alkaline electrolyte has a density of approximately 1.188 and wherein said neutral dielectric is a mineral oil having a density of approximately 0.882.

11. The battery of claim 6 wherein the direct communication between said chamber and the container is at the lower portion of said container.

12. The battery of claim 6 including a filter coning outlet for said expansion tank.

13. The battery of claim 6 wherein said container and chamber define a closed space, an instrument sensitive to pressures within said equalization chamber, and alarm means operable by said instrument at selected pressures.

14. The battery of claim 6 wherein said container comprises a sloping lid, and wherein said lid slopes toward said passageway.

15. The battery of claim 6 including a passageway connecting the lower portion of said container with said equalization chamber to provide the direct communication through which said dielectric liquid may transfer freely between the chamber and container, a valve controlled inlet means for said equalization chamber via which said dielectric liquid may be introduced into said chamber and container, and valve controlled drain means for said chamber and container.

16. That improvement in the operation of a safety storage battery intended to be used while being discharged in a dangerous atmosphere comprising providing charged cells with open casings containing alkaline electrolyte, providing a closable fluid-tight container within which said cells are positioned, providing an equalization chamber in communication with said container, providing an expansion tank also in communication with said container and with outer atmosphere, providing valve closing means between the expansion tank and the container, providing valve closing means at an inlet to the equalizing chamber, opening said two valve closing means, then filling all voids of the container and cell casings therein with neutral dielectric liquid having a density lower than that of the electrolyte of said cells, and partially also filling the expansion tank and equalizing chamber with said liquid, then closing said two valve closing means to seal off the interior container and the expansion chamber from external atmosphere and thereafter discharging the battery by use.

References Cited in the file of this patent
UNITED STATES PATENTS

| | | |
|---|---|---|
| 2,044,923 | Thompson et al. | June 23, 1936 |
| 2,578,027 | Tichenor | Dec. 11, 1951 |